United States Patent
Hsiung

(10) Patent No.: US 9,899,852 B2
(45) Date of Patent: Feb. 20, 2018

(54) POWER BANK CHARGING SYSTEM

(71) Applicant: GETAC TECHNOLOGY CORPORATION, Hsinchu County (TW)

(72) Inventor: Ta-Sung Hsiung, Taoyuan (TW)

(73) Assignee: Getac Technology Corporation, Hsinchu County (TW)

( * ) Notice: Subject to any disclaimer, the term of this patent is extended or adjusted under 35 U.S.C. 154(b) by 187 days.

(21) Appl. No.: 14/953,278

(22) Filed: Nov. 27, 2015

(65) Prior Publication Data

US 2017/0063119 A1 Mar. 2, 2017

Related U.S. Application Data

(60) Provisional application No. 62/213,185, filed on Sep. 2, 2015.

(51) Int. Cl.
*H02J 7/00* (2006.01)

(52) U.S. Cl.
CPC ..... *H02J 7/0052* (2013.01); *H02J 2007/0059* (2013.01); *H02J 2007/0062* (2013.01)

(58) Field of Classification Search
CPC .................................................. H02J 7/0052
USPC ......................................................... 320/137
See application file for complete search history.

(56) References Cited

U.S. PATENT DOCUMENTS

2015/0349563 A1* 12/2015 Bishtein ............... H02J 7/0052
320/107

* cited by examiner

*Primary Examiner* — Thuan Do

(57) ABSTRACT

A power bank charging system is provided and includes a power pin and a data transmission pin through which a charging current is provided to a power bank device, so as to increase a total charging current of the power bank device and thus shorten a charging time of the power bank device.

11 Claims, 2 Drawing Sheets

POWER BANK CHARGING SYSTEM

BACKGROUND OF THE INVENTION

Field of the Invention

The present invention relates to charging devices and more particularly to a power bank charging system.

Description of the Prior Art

Due to rapid development of mobile devices, conventional mobile devices usually support high-resolution screens and functions, such as taking pictures, watching videos, and wireless connection to the Internet. However, the aforesaid functions of conventional mobile devices come at the price of speedy consumption of the power supplied by the batteries disposed in the mobile devices. As a result, users have to access a power bank for charging conventional mobile devices to prevent them from running out of power.

In general, most power banks use USB ports or micro-USB ports in charging a battery. However, USB specifications and micro-USB specifications put a limit on the electrical current of USB and micro-USB (for example, under the existing specifications, just a maximum current of 2 A can pass through USB connection lines and micro USB connection lines for use in charging batteries) and thus restrict the charging speed of the power banks. To meet the requirement of quick charging and charge a power bank fully in a short period of time, it is necessary to use a control chip of quick charging or switch to USB C-type specifications, albeit incurring high costs.

SUMMARY OF THE INVENTION

The present invention provides a power bank charging system which efficiently increases the charging speed of a power bank.

The power bank charging system of the present invention comprises a power bank device. The power bank device comprises a first rectifying unit and a battery. The first rectifying unit is coupled between a first power pin and a first data transmission pin, such that a charging current on the first data transmission pin unidirectionally flows toward the first power pin. The battery is coupled to the first power pin and a first ground pin and coupled to the first data transmission pin through the first rectifying unit. A second data transmission pin is short-circuited to the first ground pin. The battery receives the charging current from the first power pin and the first rectifying unit and thus is charged.

In an embodiment of the present invention, the power bank charging system further comprises a transformer. The transformer comprises a power converter and a second rectifying unit. The power converter is coupled to a third data transmission pin, a fourth data transmission pin and a second ground pin. The fourth data transmission pin is short-circuited to the second ground pin, and the power converter enables AC power to undergo AC/DC conversion, so as to provide the charging current to a second power pin and the third data transmission pin. The second rectifying unit is coupled between the power converter and the second power pin, such that the charging current provided by the power converter unidirectionally flows toward the second power pin.

In an embodiment of the present invention, the second power pin and the third data transmission pin transmit the charging current to the first power pin and the first data transmission pin through a transmission cable, respectively, whereas the fourth data transmission pin and the second ground pin are coupled to the second data transmission pin and the first ground pin through the transmission cable, respectively.

In an embodiment of the present invention, the second power pin, third data transmission pin, fourth data transmission pin and second ground pin are connection pins of a USB interface, whereas the first power pin, first data transmission pin, second data transmission pin and first ground pin are connection pins of a micro USB interface.

In an embodiment of the present invention, the second rectifying unit comprises a rectifying diode with an anode coupled to a power converter and a cathode coupled to the second power pin.

In an embodiment of the present invention, the first rectifying unit comprises a rectifying diode with an anode coupled to a first data transmission pin and a cathode coupled to the first power pin.

In conclusion, in an embodiment of the present invention, the power bank charging system simultaneously uses a power pin and a data transmission pin to provide the charging current to a power bank device to thereby increase a total charging current of the power bank device, shorten charging time, and efficiently increase the charging speed of the power bank device.

BRIEF DESCRIPTION OF THE DRAWINGS

To render the features and advantages of the present invention more obvious and comprehensible, the present invention is hereunder illustrated with embodiments, drawings, and a detailed description.

DETAILED DESCRIPTION OF THE EMBODIMENTS

Figure 1:
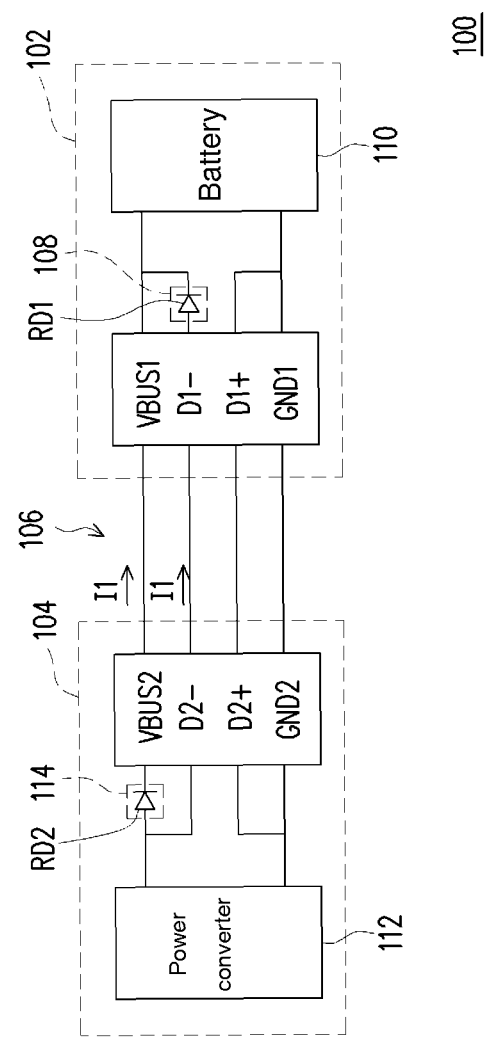
FIG. 1 is a schematic view of a power bank charging system according to an embodiment of the present invention.

Referring to FIG. 1, there is shown a schematic view of a power bank charging system according to an embodiment of the present invention. As shown in FIG. 1, a power bank charging system 100 comprises a power bank device 102 and a transformer 104. The power bank device 102 is coupled to the transformer 104 through a transmission cable 106. The transmission cable 106 is exemplified by a cable which conforms with USB specifications or a cable which conforms with micro-USB specifications. The power bank device 102 comprises a rectifying unit 108 and a battery 110. The rectifying unit 108 is coupled between power pin VBUS1 and data transmission pin D1−, such that charging current I1 on data transmission pin D1− unidirectionally flows toward power pin VBUS1. In this embodiment, rectifying diode RD1 functions as the rectifying unit 108, but the present invention is not limited thereto. The anode of the rectifying unit 108 is coupled to data transmission pin D1−. The cathode of rectifying diode RD1 is coupled to power pin VBUS1. The battery 110 is coupled to power pin VBUS1 and ground pin GND1 and coupled to data transmission pin D1− through the rectifying unit 108. Data transmission pin D1− is short-circuited to ground pin GND1. The battery 110 has its positive terminal coupled to power pin VBUS1 and its negative terminal coupled to ground pin GND1.

The transformer 104 comprises a power converter 112 and a rectifying unit 114. The power converter 112 is coupled to data transmission pin D2−, data transmission pin D2+ and ground pin GND2 and coupled to power pin VBUS2 through the rectifying unit 114. Data transmission pin D2+ is short-circuited to ground pin GND2. The rectifying unit 114 is coupled between the power converter 112 and power pin VBUS2, such that charging current I1 provided by the power converter 112 unidirectionally flows toward power pin VBUS2. Power pin VBUS2 and data transmission pin D2− are coupled to power pin VBUS1 and data transmission pin D1− through the transmission cable 106, respectively, whereas data transmission pin D2+ and ground pin GND2 are coupled to data transmission pin D1+ and ground pin GND1 through the transmission cable 106, respectively, such that a charging circuit is built between the power converter 112 and the battery 110. The aforesaid power pin VBUS1, data transmission pin D1−, data transmission pin D1+ and ground pin GND1 are exemplified by connection pins of a USB interface, whereas power pin VBUS2, data transmission pin D2−, data transmission pin D2+ and ground pin GND2 are exemplified by connection pins of a micro USB interface, but the present invention is not limited thereto.

The power converter 112 receives AC power and enables the AC power to undergo AC/DC conversion, so as to generate charging current I1, as shown in FIG. 1. The charging current I1 generated from the power converter 112 is provided to power pin VBUS2 and data transmission pin D2− and transmitted to power pin VBUS1 and data transmission pin D1− through the transmission cable 106, such that the battery 110 receives charging current I1 from power pin VBUS1 and the rectifying unit 108 and thus is charged. In this embodiment, since the power bank charging system 100 simultaneously uses a power pin and a data transmission pin to provide charging current I1 to the battery 110, the power bank charging system 100 effects a 100% increase in the total charging current of the power bank device 102 to thereby shorten the charging time of the power bank device 102 and efficiently increase the charging speed of the power bank device 102, when compared with any conventional power bank charging systems which provide a charging current to a power bank device through a power pin only. For example, if USB specifications merely allows a current of 2A to flow from power pin VBUS2 to power pin VBUS1 through the transmission cable 106, the power bank charging system 100, a charging current can be transmitted through data transmission pin D2−, the transmission cable 106, and data transmission pin D1−, before the current of 2 A is transmitted to the power bank device 102. Hence, the total charging current of 4 A is attained.

In this embodiment, rectifying diode RD2 functions as the rectifying unit 114 in the transformer 104, such that the charging path which passes the power pin matches the charging path which passes the data transmission pin, so as to maximize the total charging current within the maximum current restriction range supported by the transmission cable 106. The rectifying unit 114 has its anode coupled to the power converter 112, and rectifying diode RD2 has its cathode coupled to power pin VBUS2.

Figure 2:
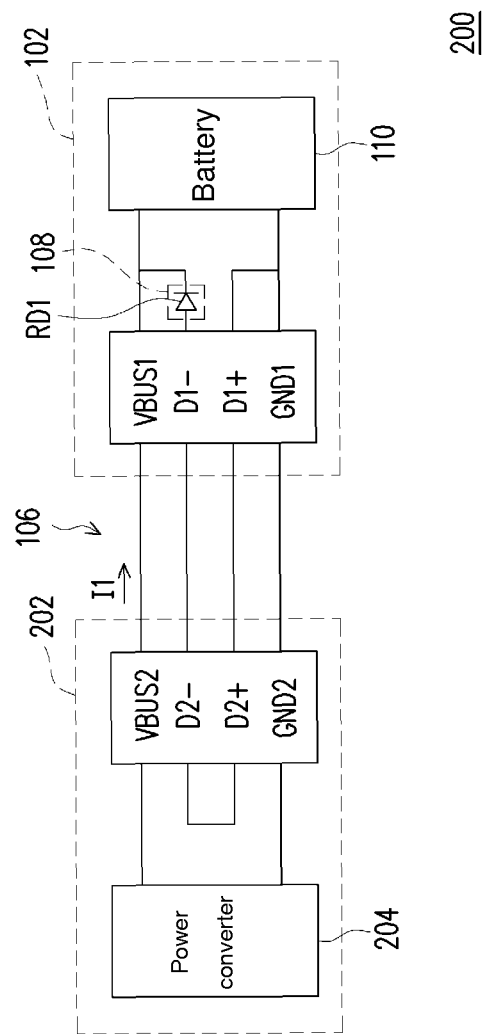
FIG. 2 is a schematic view of the power bank charging system according to another embodiment of the present invention.

In another embodiment, the power bank device 102 is coupled to a conventional transformer, as shown in FIG. 2. A conventional transformer 202 differs from the transformer 104 of the embodiment illustrated with FIG. 1 in that: the conventional transformer 202 does not comprise the rectifying unit 114; a power converter 204 only provides charging current I1 to power pin VBUS2; a short circuit is developed between data transmission pin D2− and data transmission pin D2+; and no short circuit is developed between data transmission pin D2+ and ground pin GND2. The power bank device 102 comprises the rectifying unit 108 to thereby prevent the current of power pin VBUS1 from flowing toward data transmission pin D1− and prevent charging current I1 from flowing toward the pins through the short circuit path between data transmission pin D2− and data transmission pin D2+ and the short circuit path between data transmission pin D1+ and ground pin GND1, thereby precluding the situation where the power bank device 102 cannot be charged. Hence, the rectifying unit 108 ensures that charging current I1 on data transmission pin D1− can unidirectionally flow toward power pin VBUS1 to thereby suit the power bank device 102 to the conventional transformer 202 and enhance the ease of use of the power bank device 102. According to the present invention, the power bank charging system 100 comprises the power bank device 102 and the transformer 104 which operate in conjunction with the conventional transformer 202.

In conclusion, in an embodiment of the present invention, a power bank charging system simultaneously uses a power pin and a data transmission pin to provide a charging current to a power bank device to thereby increase the total charging current of the power bank device, shorten charging time, and efficiently increase the charging speed of the power bank device. Furthermore, a rectifying unit in the power bank device causes the charging current on the data transmission pin to unidirectionally flow toward the power pin to thereby suit the power bank device to a conventional transformer and enhance the ease of use of the power bank device.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A power bank charging system, comprising:
   a power bank device, comprising:
      a first rectifying unit coupled between a first power pin and a first data transmission pin, such that a charging current on the first data transmission pin unidirectionally flows toward the first power pin; and
      a battery coupled to the first power pin and a first ground pin and coupled to the first data transmission pin through the first rectifying unit, wherein a second data transmission pin is short-circuited to the first ground pin, and the battery receives the charging current from the first power pin and the first rectifying unit and thus is charged.

2. The power bank charging system of claim 1, further comprising:
   a transformer, comprising:
      a power converter coupled to a third data transmission pin, a fourth data transmission pin and a second ground pin, wherein the fourth data transmission pin is short-circuited to the second ground pin, and the power converter enables AC power to undergo AC/DC conversion, so as to provide the charging current to a second power pin and the third data transmission pin; and
      a second rectifying unit coupled between the power converter and the second power pin, such that the charging current provided by the power converter unidirectionally flows toward the second power pin.

3. The power bank charging system of claim 2, wherein the second power pin and the third data transmission pin transmit the charging current to the first power pin and the first data transmission pin through a transmission cable, respectively, whereas the fourth data transmission pin and the second ground pin are coupled to the second data transmission pin and the first ground pin through the transmission cable, respectively.

4. The power bank charging system of claim 2, wherein the second power pin, the third data transmission pin, the fourth data transmission pin and the second ground pin are connection pins of a USB interface, whereas the first power pin, the first data transmission pin, the second data transmission pin and the first ground pin are connection pins of a micro USB interface.

5. The power bank charging system of claim 2, wherein the second rectifying unit comprises a rectifying diode with an anode coupled to the power converter and a cathode coupled to the second power pin.

6. The power bank charging system of claim 1, wherein the first rectifying unit comprises a rectifying diode with an anode coupled to the first data transmission pin and a cathode coupled to the first power pin.

7. A power bank charging system, comprising:
  a power bank device, comprising:
    a first power pin for receiving a first charging current;
    a first data pin for receiving a second charging current;
    a first rectifying unit coupled between the first power pin and the first data transmission pin, such that a second charging current received on the first data transmission pin unidirectionally flows toward the first power pin; and
    a battery coupled to the first power pin and a first ground pin and coupled to the first data transmission pin through the first rectifying unit, wherein a second data transmission pin is short-circuited to the first ground pin, such that the battery receives the first charging current from the first power pin and the second charging current from the first rectifying unit and thus is charged.

8. The power bank charging system of claim 7, further comprising:
  a transformer, comprising:
    a power converter coupled to a third data transmission pin, a fourth data transmission pin and a second ground pin, wherein the fourth data transmission pin is short-circuited to the second ground pin, and the power converter enables AC power to undergo AC/DC conversion, so as to provide the first charging current to a second power pin and the second charging current to the third data transmission pin; and
    a second rectifying unit coupled between the power converter and the second power pin, such that the charging current provided by the power converter unidirectionally flows toward the second power pin; and
  a transmission cable coupling the second power pin to the first power pin and the third data transmission pin to the first data transmission pin.

9. The power bank charging system of claim 8, wherein the second power pin, the third data transmission pin, the fourth data transmission pin and the second ground pin are connection pins of a USB interface, whereas the first power pin, the first data transmission pin, the second data transmission pin and the first ground pin are connection pins of a micro USB interface.

10. The power bank charging system of claim 8, wherein the second rectifying unit comprises a rectifying diode with an anode coupled to the power converter and a cathode coupled to the second power pin.

11. The power bank charging system of claim 7, wherein the first rectifying unit comprises a rectifying diode with an anode coupled to the first data transmission pin and a cathode coupled to the first power pin.

* * * * *